(12) United States Patent
DiNatale

(10) Patent No.: US 7,874,549 B2
(45) Date of Patent: Jan. 25, 2011

(54) CUTTING/CHOPPING BOARD INCLUDING OPERATOR SAFETY MEANS

(76) Inventor: John DiNatale, 7230 Oakwood Ave., Cocoa, FL (US) 32927

( * ) Notice: Subject to any disclaimer, the term of this patent is extended or adjusted under 35 U.S.C. 154(b) by 0 days.

(21) Appl. No.: 11/890,855

(22) Filed: Aug. 8, 2007

(65) Prior Publication Data

US 2008/0303199 A1    Dec. 11, 2008

Related U.S. Application Data

(60) Provisional application No. 60/933,941, filed on Jun. 11, 2007.

(51) Int. Cl.
    *B23Q 3/00* (2006.01)
(52) U.S. Cl. .................. 269/289 R; 269/302.1
(58) Field of Classification Search .......... 269/37, 269/41, 303–305, 319, 289 R, 302.1; 83/468.5, 83/468.6, 468.7, 468.9; 227/154
    See application file for complete search history.

(56) References Cited

U.S. PATENT DOCUMENTS

| 1,410,519 | A | * | 3/1922 | Stengel | 269/319 |
| 4,065,115 | A | * | 12/1977 | Popeil et al. | 269/16 |
| 6,571,448 | B2 | * | 6/2003 | Lee et al. | 29/267 |
| 6,910,685 | B2 | * | 6/2005 | Sellers | 269/289 R |
| 7,322,573 | B1 | * | 1/2008 | Edmond et al. | 269/289 R |
| 7,422,202 | B2 | * | 9/2008 | Wu | 269/303 |
| 2008/0303199 | A1 | * | 12/2008 | DiNatale | 269/289 R |

* cited by examiner

*Primary Examiner*—Lee D Wilson
(74) *Attorney, Agent, or Firm*—William H. McNeill

(57) ABSTRACT

A cutting board (10) has a base (12) with a planar cutting surface (14). A fixed fence (16) having first and second ends (18, 20) is provided, the fixed fence (16) being mounted to the planar surface (14) of the base (12). A moveable fence (22), has first and second ends (24, 26), with the first of the moveable fence ends (22) being pivotally attached to the first end (18) of the fixed fence (16).

11 Claims, 5 Drawing Sheets

CUTTING/CHOPPING BOARD INCLUDING OPERATOR SAFETY MEANS

CROSS-REFERENCE TO RELATED APPLICATION

This application claims priority from Provisional Patent Application No. 60/933,941, filed Jun. 11, 2007.

TECHNICAL FIELD

This invention relates generally to cutting or chopping boards and more particularly to such boards including safety features for the protection of the user, such safety features not only not interfering with the use of the board but also actually enhancing its functions.

BACKGROUND ART

Cutting boards are undoubtedly ubiquitous throughout human history, their creation probably occurring simultaneously with the stone knife. Similarly, accidents with the same, such as the unintended slicing of the operator's finger, are probably equally ubiquitous.

Modern cutting boards generally comprise a wood or hard plastic working surface upon which food preparation takes place. When wood is used it is common to construct a board of multiple pieces of end grain hard wood, for example, hard maple. Multiple types of plastic have been employed, usually from the polystyrene family. Regardless of the type or types of materials used, accidents still happen with alarming frequency.

DISCLOSURE OF INVENTION

Accordingly, it is an object of this invention to obviate the disadvantages of the prior art.

It is another object of the invention to enhance the utility of cutting boards to improve their safety.

These objects are accomplished, in one aspect of the invention, by a cutting board comprising: a base having a planar cutting surface; a fixed fence having first and second ends, the fixed fence being mounted to the planar surface of the base; and a moveable fence, the moveable fence having first and second ends with the first of the moveable fence ends being pivotally attached to the first end of the fixed fence. The moveable fence provides a knife guide, which keeps the user's hands, particularly the fingers thereof, away from the cutting or chopping operation being performed.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
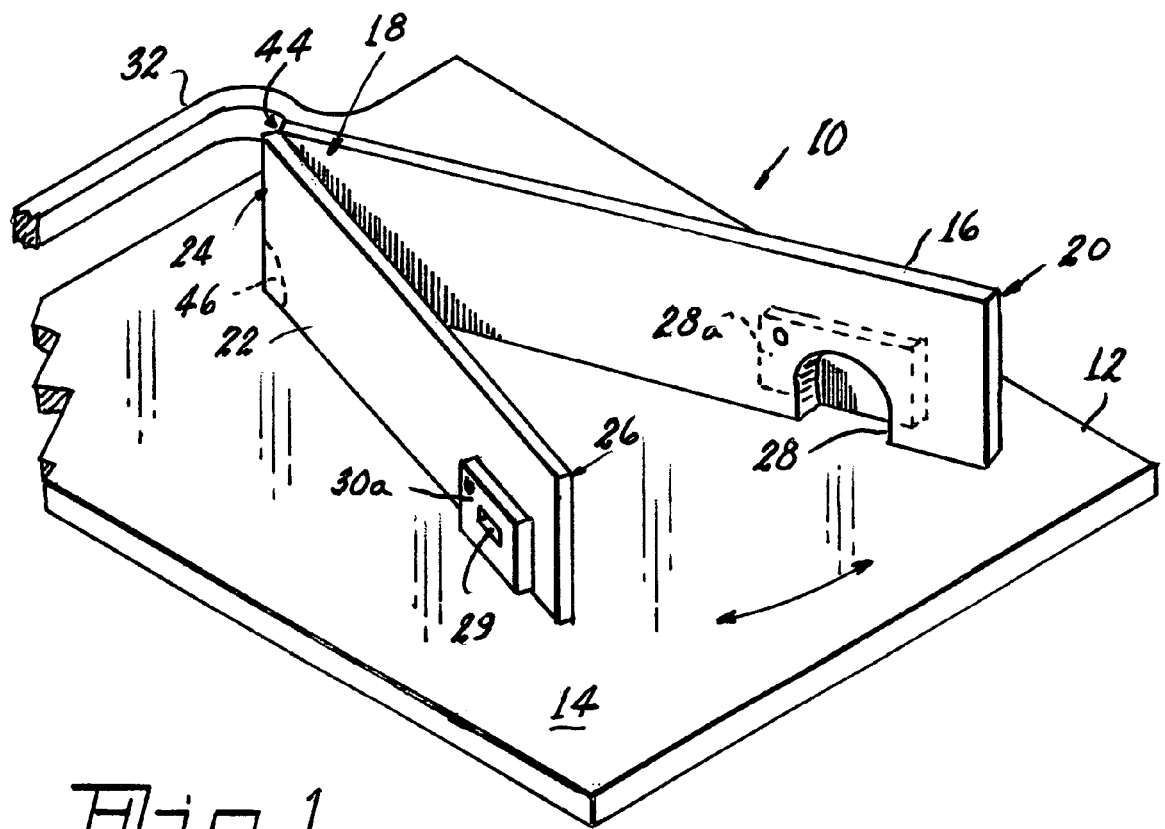
FIG. 1 is a perspective view of an embodiment of the invention.
Figure 6:
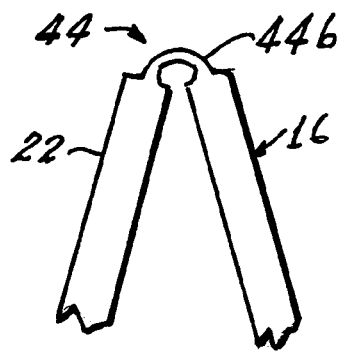
FIG. 6 is a plan view of one type of hinge useable with the invention.
Figure 7:
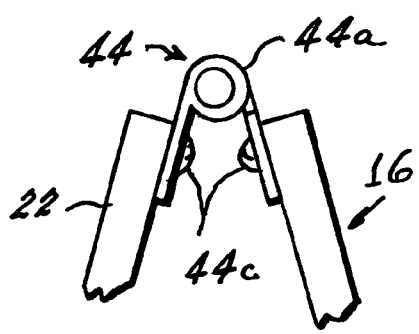
FIG. 7 is a plan view of another type of hinge useable with the invention.
Figure 8:
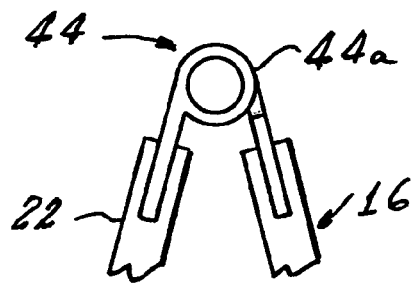
FIG. 8 is a plan view of yet another type of hinge useable with the invention.

Referring now to the drawings with greater particularity, there is shown in FIG. 1 a cutting board 10 comprising a base 12 with a planar cutting surface 14. A fixed fence 16 having first and second ends 18, 20, is mounted to the planar surface 14. A moveable fence 22 with first and second ends 24, 26, has the first end 24 pivotally attached to the first end 18 of the fixed fence 16 by a hinge 44. Any convenient type of hinge 44 can be used, such as, for example, a molded hinge 44b (FIG. 6), a small piano type hinge 44a (FIG. 7) that can be attached to the fences with screws or bolts 44c. Alternatively a hinge 44 of the piano type can be molded in to the fences in those instances where a molded material is used. Such a construction is shown in FIG. 8.

Any suitable material can be used for the base and fences, for example, wood, metal, marble or similar stone, or any of the hard plastics, such as the nylons or polystyrenes, and it is not necessary that the base and fences be constructed of the same material. For example, the base can be wood and the fences molded plastic. For economy and convenience, a suitable plastic is preferred for the base and the fences.

The second end 20 of the fixed fence 16 and the second end 26 of the moveable fence 22 have openings 28, 30, respectively, that are closed with pivotable gates 28a, 30a, whose use will be explained hereinafter. The gates are provided with opening aids 29, which can be protrusions or, as shown, indents.

Figure 10:
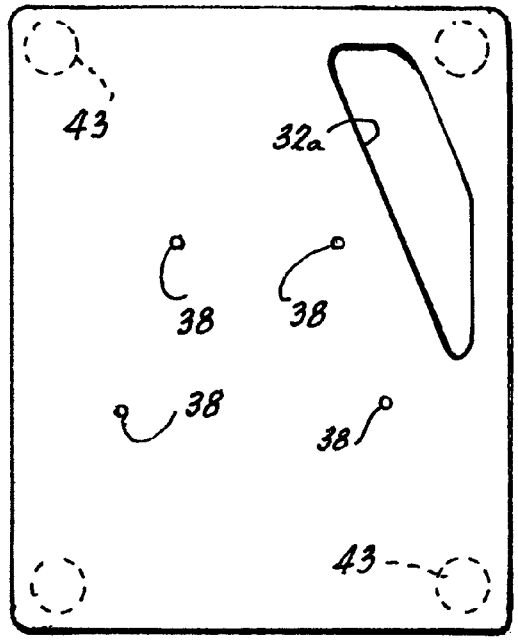
FIG. 10 is a plan view of the cutting board base.

For convenience the cutting board has a handle 32 that can extend from the base 12 (FIG. 1) or be formed into the base 12, such as handle 32a (FIG. 10).

Figure 2:
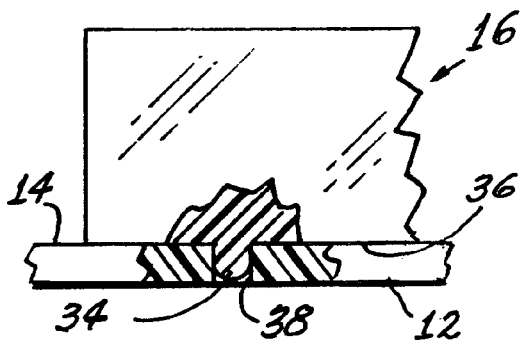
FIG. 2 is a partial elevational view illustrating a mounting structure for a fixed fence.

The manner of positioning the fixed fence 16 on the base 12 can be accomplished in a number of ways. A few non-limiting structures are shown in FIGS. 2-5. In FIG. 2 the fixed fence 16 has at least two projections 34 (only one of which is shown in the figure) formed on a bottom edge 36, the projections 34 being formed to cooperate with apertures 38 formed in the planar cutting surface 14. While it is not necessary for the apertures 38 to be through-apertures, it is the latter that is preferred, as such a structure will make cleaning the board easier.

Figure 3:
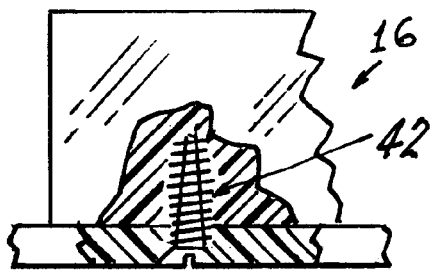
FIG. 3 is a similar view of an alternate mounting structure.
Figure 4:
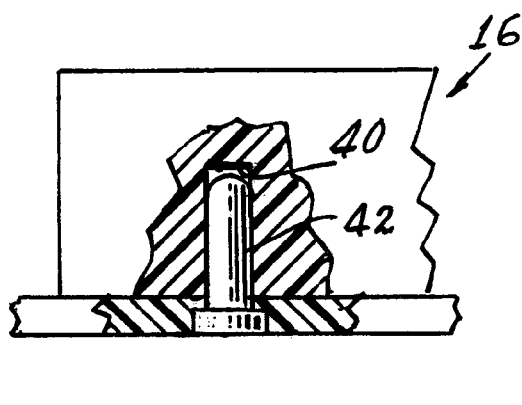
FIG. 4 is a similar view of yet another alternate mounting structure.
Figure 5:
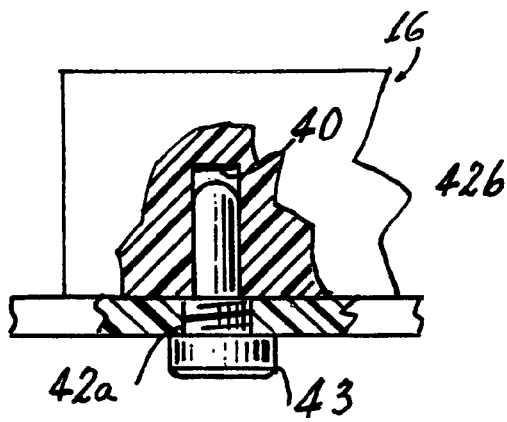
FIG. 5 is a similar view of still another alternate mounting structure.

Alternatively, the fixed fence 16 can have retainer apertures 40 formed in the bottom edge 36 to receive studs 42 projecting from the planar surface 14. The studs 42 can take the form of a threaded instrument as shown in FIG. 3, a plain stud 42a as shown in FIG. 4 or a "quick turn" stud 42b, as shown in FIG. 5. The stud 42b can have, for example, a single turn thread that engages a similar thread in the aperture 40a that is formed in the base 12. If desired, a foot 43 can be a part of any of the studs to aid in supporting the base 12 during cutting operations. Additional feet 43 are provided at the corners of the base 12, as shown in FIG. 10.

Figure 9:
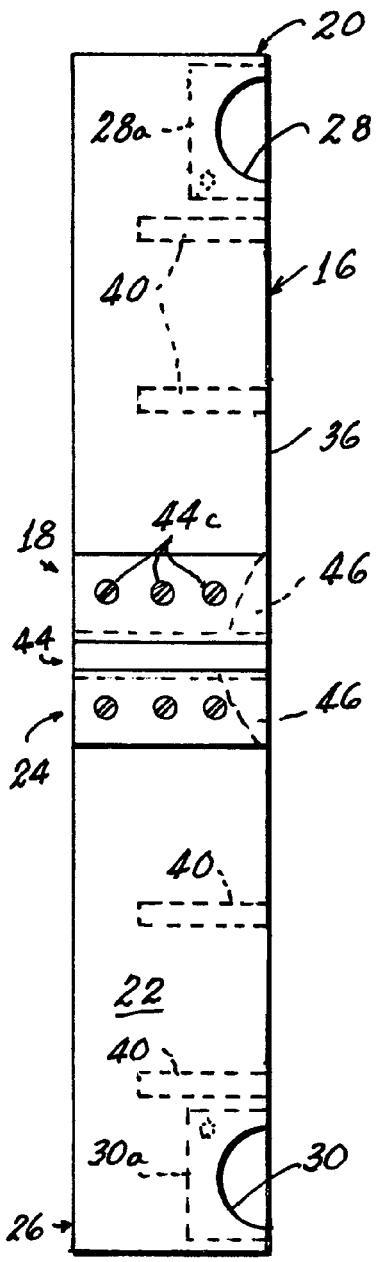
FIG. 9 is an elevational view of the joined fences.

A cutout portion 46 (shown in phantom lines in FIGS. 1 and 9) can be provided at the joined ends to accept a knife for certain tasks.

To make the cutting board 10 truly ambidextrous, the base 12 is provide with two sets of apertures 38 (or 40a) and the moveable fence 22 is provided also with apertures 40, thus allowing the user to make either the left or right fence the moveable fence.

Figure 12:
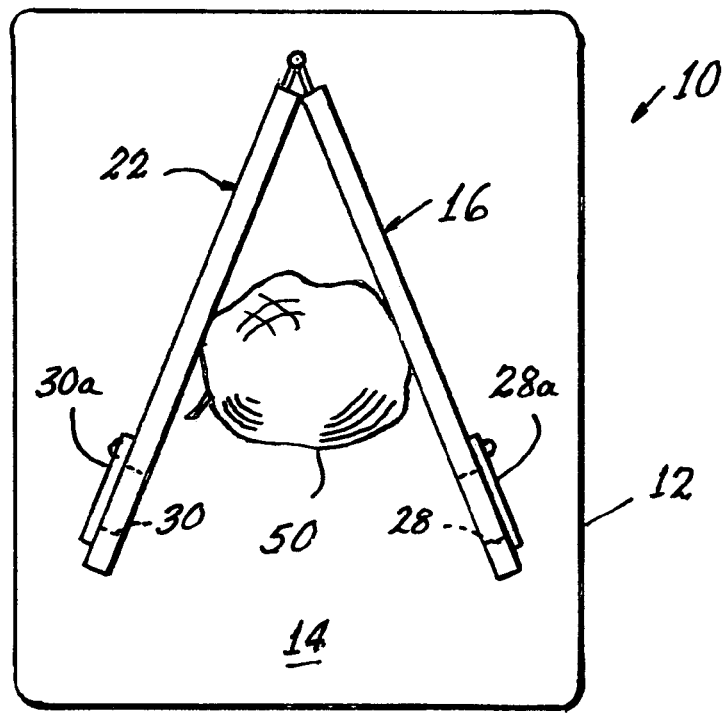
FIG. 12 is a plan view of another cutting operation.

The cutting board 10 is truly utilitarian. For example, to slice a more or less spherical foodstuff, such as a tomato 50 (FIG. 12) the tomato is placed between the fences and easily sliced. With the operator keeping small tension on the outside of the moveable fence 22 the operator's fingers are positioned well away from the cutting edge of the knife.

Figure 11:
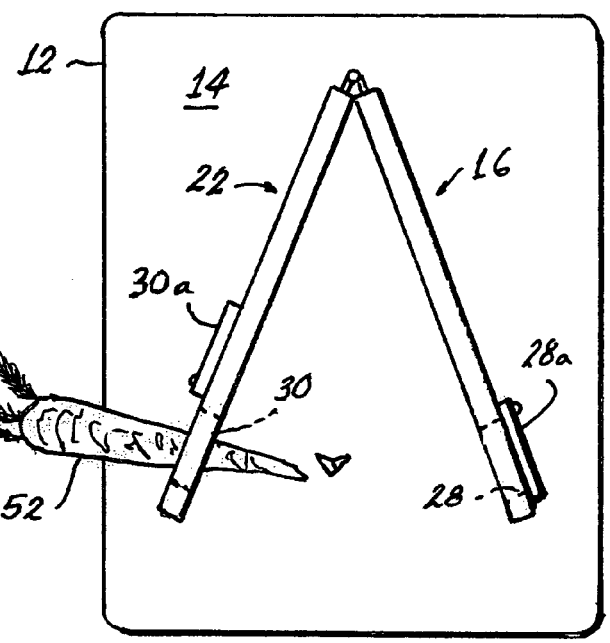
FIG. 11 is a plan view of a cutting operation.
Figure 13:
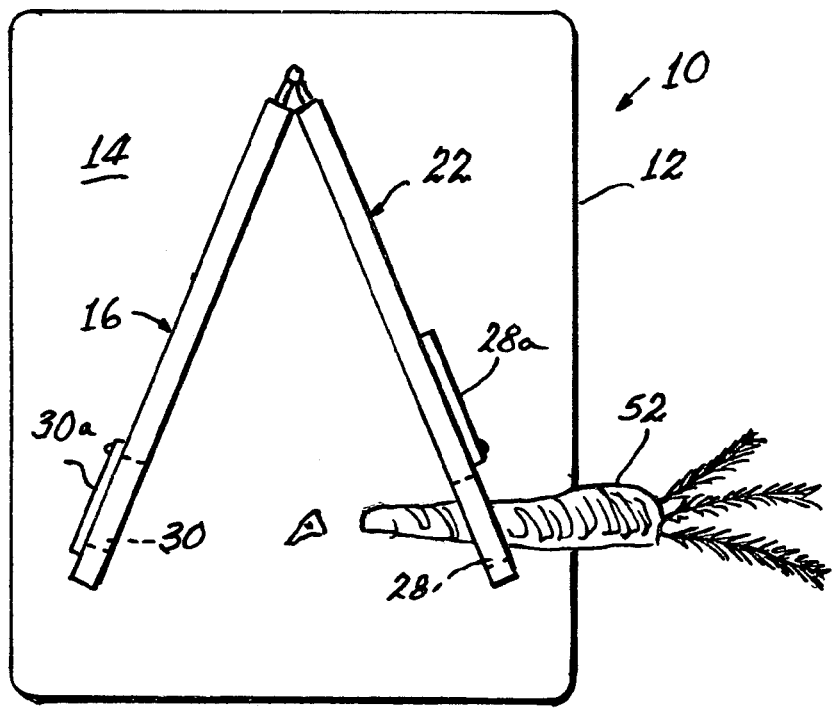
FIG. 13 is a plan view of still another cutting operation.
Figure 14:
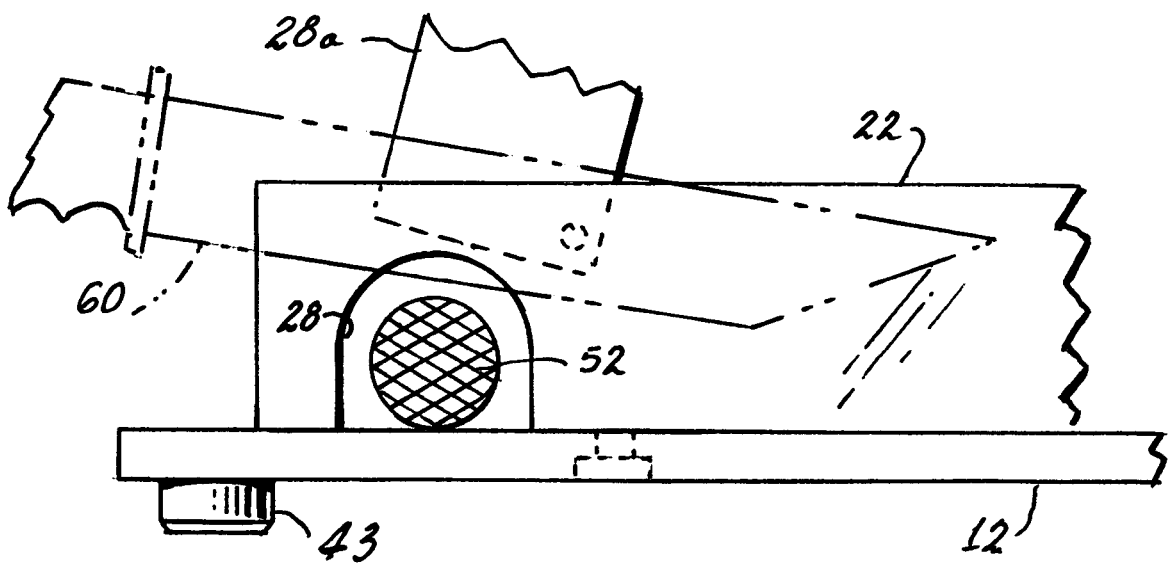
FIG. 14 is an elevation view of a cutting operation.

Similarly, to cut an elongated foodstuff, such as celery or a carrot 52 (illustrated) either one of the gates 28a or 30a is raised and the carrot fed through the appropriate opening 28 or 30. FIG. 11 illustrates the embodiment wherein the moveable fence 22 is on the left, for use by a right-handed operator, and FIG. 13 illustrates the embodiment where the moveable fence 22 is positioned on the right, for use by a left-handed operator. As can be seen from FIG. 14, by keeping a knife 60 within the confines of the angled area formed by the fixed and moveable fences, operator safety is greatly enhanced.

Depending, of course, upon the materials used for the cutting board base 12 and the fences 16 and 22, cleaning is also easily accomplished, due to the removable feature of the fences. After the cutting operations are completed, the fixed fence 16 (and its attached fence 22) are removed and all parts can be cleaned, either by hand or, if the materials are suitable, by machine.

Figure 15:
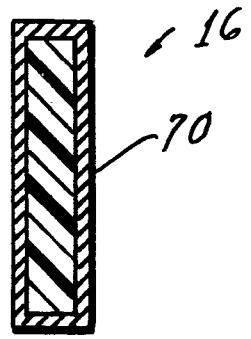
FIG. 15 is a sectional view of an alternate form of fence.

While the cutting board as shown and described above is very suitable for home use, if commercial use is contemplated, an alternative fence construction can be used. For example, one such alternate fence is shown FIG. 15, wherein a metal covering 70, such as stainless steel can be used.

Thus, there is here provided a cutting board having operator safety and convenience as core features. It is easily assembled and disassembled and equally useable by right-handed or left-handed operators.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A cutting board comprising:
   a base having a planar cutting surface;
   a fixed fence having first and second ends, said fixed fence being mounted to said planar surface of said base; and
   a moveable fence, said moveable fence having first and second ends with said first of said moveable fence ends being pivotally attached to said first end of said fixed fence.

2. The cutting board of claim 1 wherein said second end of said fixed fence and said second end of said moveable fence have openings with gates.

3. The cutting board of claim 1 wherein said cutting board has a handle extending from said base.

4. The cutting board of claim 1 wherein said cutting board has a handle formed within said base.

5. The cutting board of claim 1 wherein said fixed fence has at least two projections formed on a bottom edge, said at least two projections being formed to cooperate with apertures formed in said planar cutting surface.

6. The cutting board of claim 1 wherein said fixed fence has retainer apertures in a bottom edge to receive studs projecting from said planar surface.

7. The cutting board of claim 1 wherein the moveable fence is joined to the fixed fence by a hinge.

8. The cutting board of claim 7 wherein said hinge is a removable hinge.

9. The cutting board of claim 7 wherein said hinge is a molded hinge.

10. The cutting board of claim 1 wherein the fixed fence and the moveable fence have a cutout portion at the joined ends.

11. A cutting board comprising:
    a base having a planar cutting surface;
    a fixed fence having first and second ends, said fixed fence being mounted to said planar surface of said base, said fixed fence being permanently immovable while said cutting board is being used; and
    a moveable fence, said moveable fence having first and second ends with said first of said moveable fence ends being pivotally attached to said first end of said fixed fence, said moveable fence being continuously moveable while said cutting board is being used.

* * * * *